Figure 1:
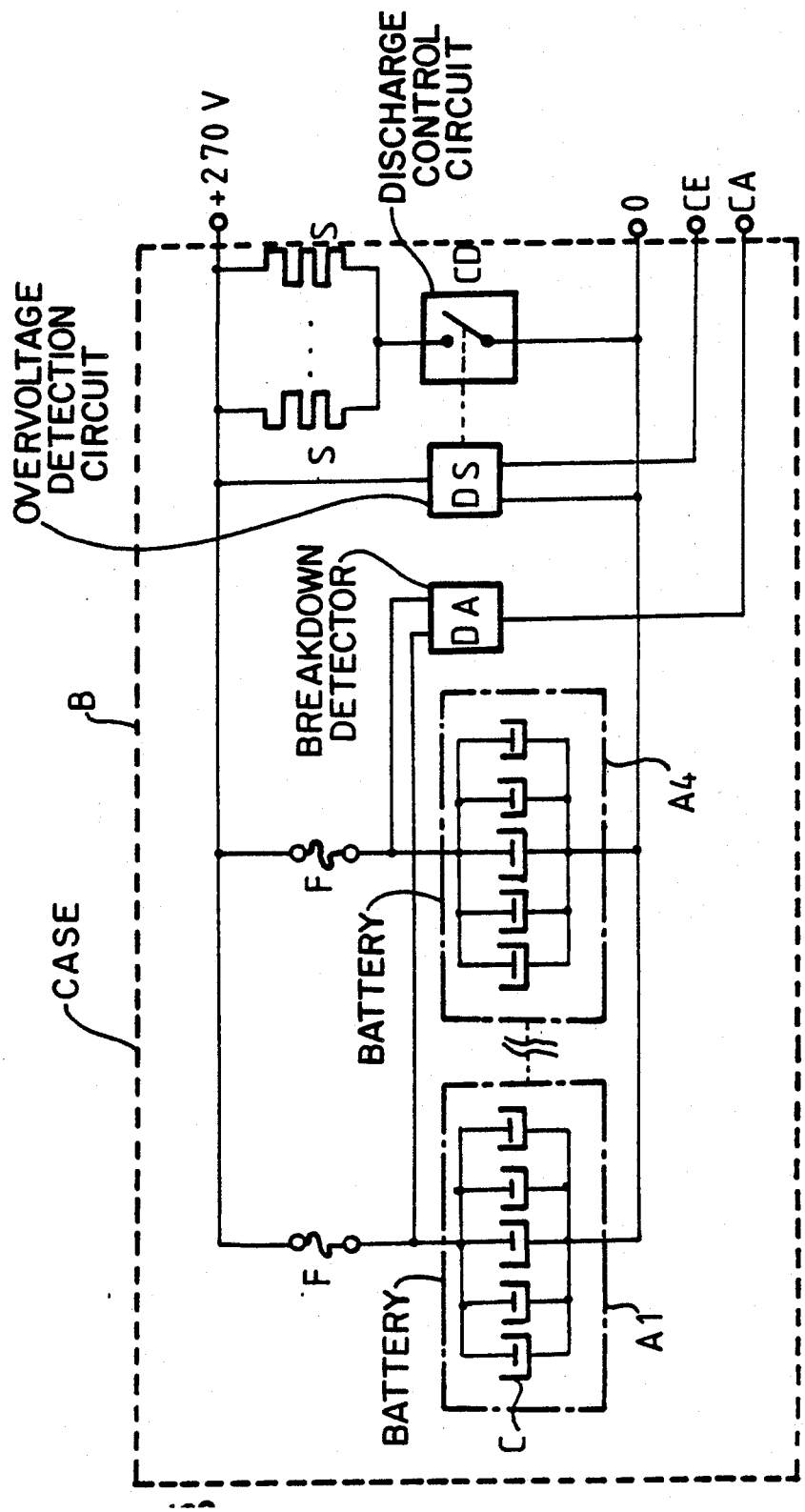

United States Patent [19]

Kaitandjian et al.

[11] Patent Number: 5,073,751
[45] Date of Patent: Dec. 17, 1991

[54] CAPACITIVE TYPE ELECTRIC ENERGY ACCUMULATOR OF HIGH CAPACITY

[75] Inventors: Michel Kaitandjian, Le Chesnay; Philippe J. Pradat, Les Ulis; Jean P. Latouche-Hallé, Longjumeau; Alain M. Falipou, Velizy, all of France

[73] Assignees: Compagnie de Signaux et d'Equipements Electroniques; Etat Francais Represente Par le Delegue Genral Pour L'Armement, both of France

[21] Appl. No.: 348,263

[22] Filed: May 5, 1989

[30] Foreign Application Priority Data

May 6, 1988 [FR] France ................. 88 06162

[51] Int. Cl.$^5$ .................. H02J 7/00; H02H 7/16
[52] U.S. Cl. ..................... 320/1; 361/15; 361/272; 361/344
[58] Field of Search ................. 361/15-17, 361/272, 275, 343, 344, 522; 320/1, 7, 13

[56] References Cited

U.S. PATENT DOCUMENTS

| | | | |
|---|---|---|---|
| 2,660,694 | 11/1953 | Cuttino | 361/344 |
| 3,628,091 | 12/1971 | Wolf | 361/15 |
| 3,692,401 | 9/1972 | Kawai | 320/1 X |
| 4,012,667 | 3/1977 | Ishida et al. | 361/15 X |
| 4,295,174 | 10/1981 | Peterson et al. | 361/16 |
| 4,673,852 | 6/1987 | Geiger | 318/271 |

Primary Examiner—R. J. Hickey
Attorney, Agent, or Firm—Anthony H. Casella; Gerald E. Hespos

[57] ABSTRACT

The invention provides an electric energy accumulator of capacitive type, with high capacity, characterized in that it comprises a plurality of electrochemical capacitors (C) connected in parallel and disposed inside the same case (B) comprising an overvoltage detection circuit (DS) and a circuit (CD) for controlling discharge of the capacitors into heat dissipation shunts (S) integrated in the case (B).

4 Claims, 2 Drawing Sheets

CAPACITIVE TYPE ELECTRIC ENERGY ACCUMULATOR OF HIGH CAPACITY

The present invention relates to an electric energy accumulator of capacitive type, having a high capacity, applicable more particularly to a system, with energy recovery, for electrically controlling the turret of a tank.

In such an application, a high capacity accumulator is required which raises both problems of space and problems of safety for the users. In fact, the capacitors are likely to explode when they are subjected to a voltage higher than their rated voltage. Now, the effects of such an explosion are obviously all the greater the higher the capacity.

The main object of the present invention is then to provide a high capacity accumulator having at the same time high safety in use.

For this, the accumulator of the invention is essentially characterized in that it comprises a plurality of electrochemical capacitors connected in parallel and disposed inside the same case comprising an overvoltage detection circuit and a circuit for controlling the discharge of the capacitors into heat dissipation shunts integrated in the case.

With this arrangement, the capacitors no longer risk exploding, since they are immediately discharged as soon as an abnormal overvoltage is detected. In addition, since these capacitors are enclosed in a case, the risks of electrocution are very limited.

Preferably, the capacitors are distributed inside each case in several batteries each associated with a fuse. Also preferably, a breakdown detector is provided for locating the defective capacitor battery.

Thus, in the case of a short-circuit on one of the capacitors, the fuse is destroyed and isolates the corresponding battery, which does not endanger the correct operation of the whole. Furthermore, the defective battery is located and may then be repaired as soon as the conditions of use permit it.

In a particular embodiment of the invention, the case is formed of a receptacle having a lid and comprises a device for detecting the opening of the lid, which automatically triggers off discharge of the capacitors, so as to limit the risks of electrocution.

In addition, the case is in the form of a circular sector able to be placed side by side with other identical cases so as to form at least a partial ring.

Such an arrangement is in fact particularly interesting in the case where the accumulator is to be housed in the turret of a tank.

Figure 2:
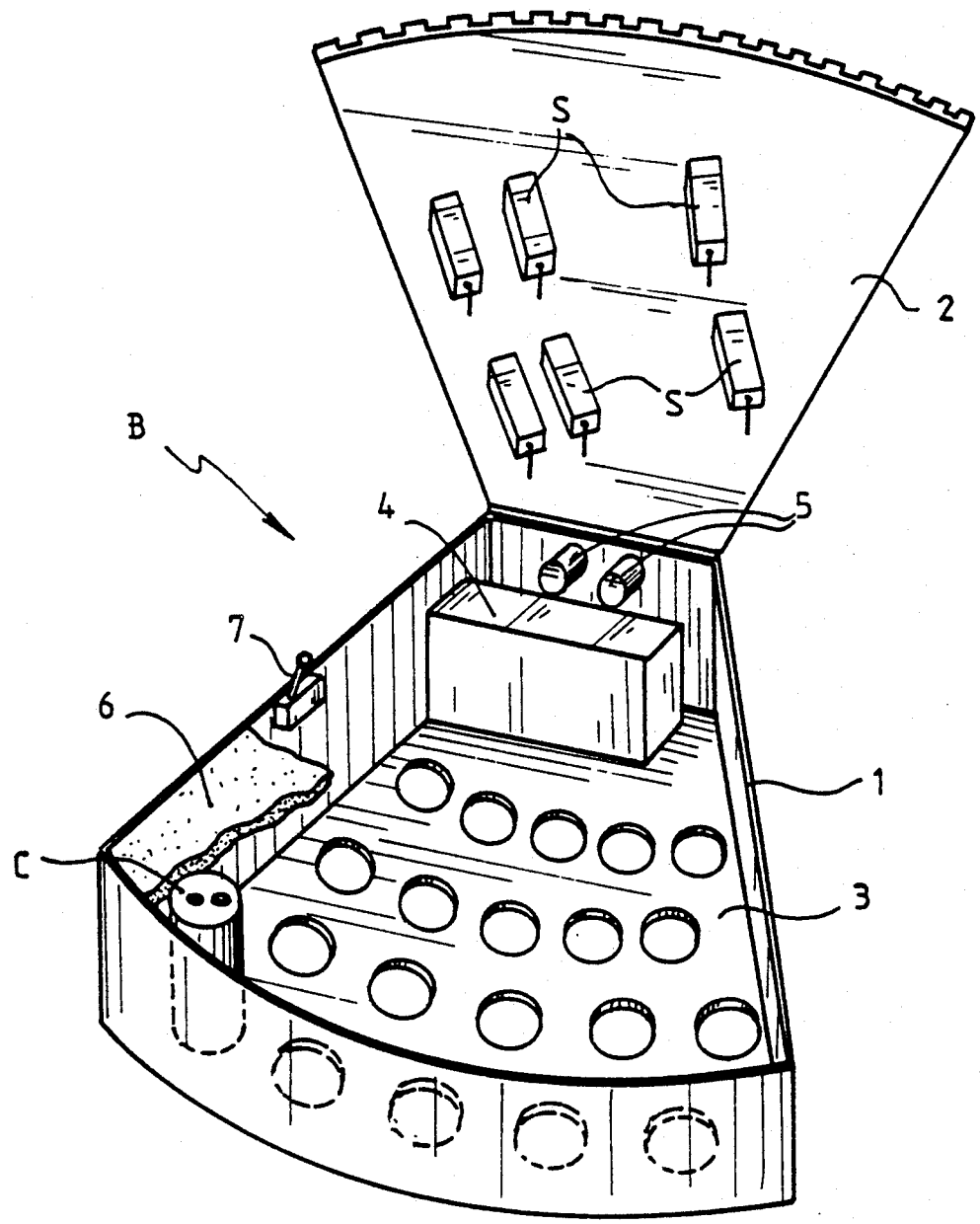

One embodiment of the invention is described hereafter by way of example, with reference to the accompanying drawings in which:

FIG. 1 is a partial block diagram of a capacitive accumulator in accordance with the invention; and FIG. 2 is a simplified perspective view showing the material organisation of such an accumulator.

The capacitive accumulator shown in FIG. 1 has a relatively high capacity of about 0.25 Farad and it is essentially formed by connecting in parallel 20 electrochemical capacitors C of 12 500 $\mu$F each.

In accordance with the invention, all these capacitors are disposed inside the same case B, shown in FIG. 2, which is equipped with an overvoltage detection circuit DS controlling a discharge switch CD connected in series with heat dissipation shunts S integrated in the case. The capacitors are normally subjected to a nominal voltage of about 270 V and when an abnormal overvoltage is detected by circuit DS, switch CD closes and causes the immediate discharge of the capacitors into the shunts S in a time less than 2 seconds. The overvoltage detector DS is also provided with a control external to case CE for voluntarily causing the discharge of the capacitors outside the periods of use of the system.

According to another characteristic of the invention, capacitors C are distributed inside case B in four identical batteries ($A_1 \ldots A_4$) comprising five capacitors, each associated with a fuse F. Thus, when a breakdown of short-circuit type appears on one of the capacitors, it causes destruction of the fuse of the corresponding battery. The defective battery is then isolated, which does not prevent the other batteries from operating normally.

A breakdown detector DA is further provided, with a connection to the outside CA for locating the case in which the defective battery is located, for repairing it as soon as the conditions of use permit such a repair.

The material organisation of such a capacitive accumulator will now be described with reference more particularly to FIG. 2.

As can be seen in this figure, case B is essentially formed by a receptacle 1 in the form of a circular sector, with an angle at the apex of about 60°, closed sealingly by a lid 2. Capacitors C are disposed upright and in a staggered arrangement on an alveolate bottom plate 3, made for example from Teflon, in four successive rows corresponding respectively to the four batteries $A_1$ to $A_4$.

At the level of the angle at the apex, which is truncated, is provided an electronic block 4 containing the overvoltage detector DS, the discharge switch CD and the breakdown detector DA. Just above are situated connectors 5 for providing connections with the outside of the electronic block 4 and capacitors C. The assembly is covered by a foam block 6 for maintaining the capacitors in the recesses of the bottom plate 3.

Shunts S are fixed to the internal side of lid 2 whose external side is grooved so as to form a heat sink. Furthermore, a contactor 7 is placed inside the receptacle 1 so as to be operated by lid 2 in the closed position thereof. Thus, when the lid is open for any reason, contactor 7 is actuated and then automatically causes discharge of the capacitors into shunts S, so as to avoid any risk of electrocution.

With this set of arrangements, the capacitive accumulator of the invention exhibits both high safety in use and high operational availability because of its cellular organisation. In the particular application contemplated here, namely the electric motorization of the turret of a tank, an accumulator is in fact required having a high capacity of the order of 1F. It is then necessary to associate together several cases such as the one which has just been described, and the particular shape of these cases makes it possible to form, by juxtapositioning, partial rings which are perfectly integrated in the turret of a tank.

We claim:

1. An electric energy accumulator of capacitive type for use in an electrically motorized turret of a tank, said turret comprising a generally circular rotatable member, the accumulator comprising: a plurality of cases each defining a circular sector, said cases being placed side by side so as to form at least a partial ring mounted to the generally circular rotatable member of the turret, heat dissipation shunts integrated in each said case, a plurality of electrochemical capacitors connected in parallel and disposed inside each said case, each said case further housing an over-voltage detection circuit and a circuit for controlling discharge of the capacitors into the heat dissipation shunts in the case, whereby the capacitors are discharged when an abnormal over-voltage is detected, thereby avoiding explosion of the capacitors and resulting damage in proximity to the turret of the tank.

2. An electric energy accumulator according to claim 6, further comprising a plurality of fuses and being characterized in that the capacitors are distributed inside the respective cases in a plurality of separate batteries ($A_1 \ldots A_4$) each said battery being electrically connected with one said fuse (F) such that a short circuit in one of said capacitors causes destruction of the fuse (F) of the corresponding batter ($A_1 \ldots A_4$) and such that the remaining ones of said batteries ($A_1 \ldots A_4$) continue operating.

3. Electric energy accumulator according to claim 2 characterized in that said accumulator comprises a breakdown detector (DA) for locating one of said cases having a defect in one of said batteries caused by the destruction of said fuse associated therewith.

4. An electric energy accumulator according to claim 3, characterized in that each said case comprises a selectively openable lid (2) and further comprises a switch means (7) for detecting the opening of the lid (2), said switch means being electrically connected to the shunts for automatically triggering off discharge of the capacitors.

* * * * *